(12) United States Patent
Nishida (10) Patent No.: US 9,250,846 B2
(45) Date of Patent: Feb. 2, 2016

(54) PRINT SERVICE PROVIDING APPARATUS THAT SUPPLIES CONVERSION DATA AND PRINTING SYSTEM INCLUDING THE SAME

(71) Applicant: FUJI XEROX CO., LTD., Tokyo (JP)

(72) Inventor: Toru Nishida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/257,038

(22) Filed: Apr. 21, 2014

(65) Prior Publication Data

US 2015/0161487 A1   Jun. 11, 2015

(30) Foreign Application Priority Data

Dec. 11, 2013 (JP) ................................. 2013-256027

(51) Int. Cl.
*G06F 3/12* (2006.01)
*H04N 1/00* (2006.01)

(52) U.S. Cl.
CPC ............ *G06F 3/1287* (2013.01); *G06F 3/1215* (2013.01); *G06F 3/1247* (2013.01); *G06F 3/1267* (2013.01); *G06F 3/1288* (2013.01)

(58) Field of Classification Search
CPC .......... H04N 1/00244; H04N 1/32149; H04N 1/32128; H04N 2201/3274; H04N 2201/0094; H04N 2201/3254; G06K 15/02

USPC ............... 358/1.1, 1.9, 1.13, 1.15, 1.16, 1.18, 358/402; 709/203; 707/756

See application file for complete search history.

(56) References Cited

U.S. PATENT DOCUMENTS

| | | | |
|---|---|---|---|
| 2012/0081725 A1* | 4/2012 | Tsukamoto | 358/1.9 |
| 2013/0083362 A1* | 4/2013 | Tanaka | 358/1.16 |
| 2013/0198211 A1* | 8/2013 | Kohkaki et al. | 707/756 |
| 2014/0002830 A1* | 1/2014 | Kai | 358/1.2 |
| 2014/0201759 A1* | 7/2014 | Amikura | 718/106 |
| 2014/0368865 A1* | 12/2014 | Gutnik et al. | 358/1.15 |

FOREIGN PATENT DOCUMENTS

| | | |
|---|---|---|
| JP | 2012-63944 | 3/2012 |
| JP | 2012-133685 | 7/2012 |

OTHER PUBLICATIONS

Abstract and machine translation of JP 2012-133685.
Abstract and machine translation of JP 2012-063944.

* cited by examiner

*Primary Examiner* — Gabriel Garcia
(74) *Attorney, Agent, or Firm* — Fildes & Outland, P.C.

(57) ABSTRACT

The invention is directed to a print service providing apparatus which is disposed on a network and connected to at least one printer through a communication line so as to provide print service, the apparatus including: a storage unit that stores, in advance, conversion data which have been converted into a bitmap format; and a supply unit that acquires, in accordance with a print instruction, the conversion data stored in the storage unit and supplies the conversion data to the printer connected through the communication line.

10 Claims, 7 Drawing Sheets

PRINT SERVICE PROVIDING APPARATUS THAT SUPPLIES CONVERSION DATA AND PRINTING SYSTEM INCLUDING THE SAME

CROSS-REFERENCE TO RELATED APPLICATIONS

This application is based on and claims priority under 35 USC 119 from Japanese Patent Application No. 2013-256027 filed on Dec. 11, 2013.

BACKGROUND

Technical Field

The present invention relates to a print service providing apparatus and a printing system.

SUMMARY

According to an aspect of the invention, there is provided a print service providing apparatus which is disposed on a network and connected to at least one printer through a communication line so as to provide print service, the apparatus comprising:
a storage unit which stores, in advance, conversion data which have been converted into a bitmap format; and
a supply unit which acquires, in accordance with a print instruction, the conversion data stored in the storage unit and supplies the conversion data to the printer connected through the communication line.

BRIEF DESCRIPTION OF THE DRAWINGS

Exemplary embodiments of the present invention will be described in detail based on the following figures, wherein.

REFERENCE SIGNS LIST 10 printing system
12 local area network (LAN)
14 firewall (FW)
16 cloud
18 cloud print service
20 client terminal
22 printer
24 agent server
26 RIP server
70 print server
72 storage
74 Web browser
76 conversion data registration application
78 job management portion
80 print instruction application
82 print job management folder
84 temporary reception folder
86 print instruction file
90 screen
92 job file
94 check box
96 registration button
100 screen
102 job file
104 check box
106 number-of-copies setting portion
108 output destination portion
110 print instruction button

DETAILED DESCRIPTION

Figure 1:
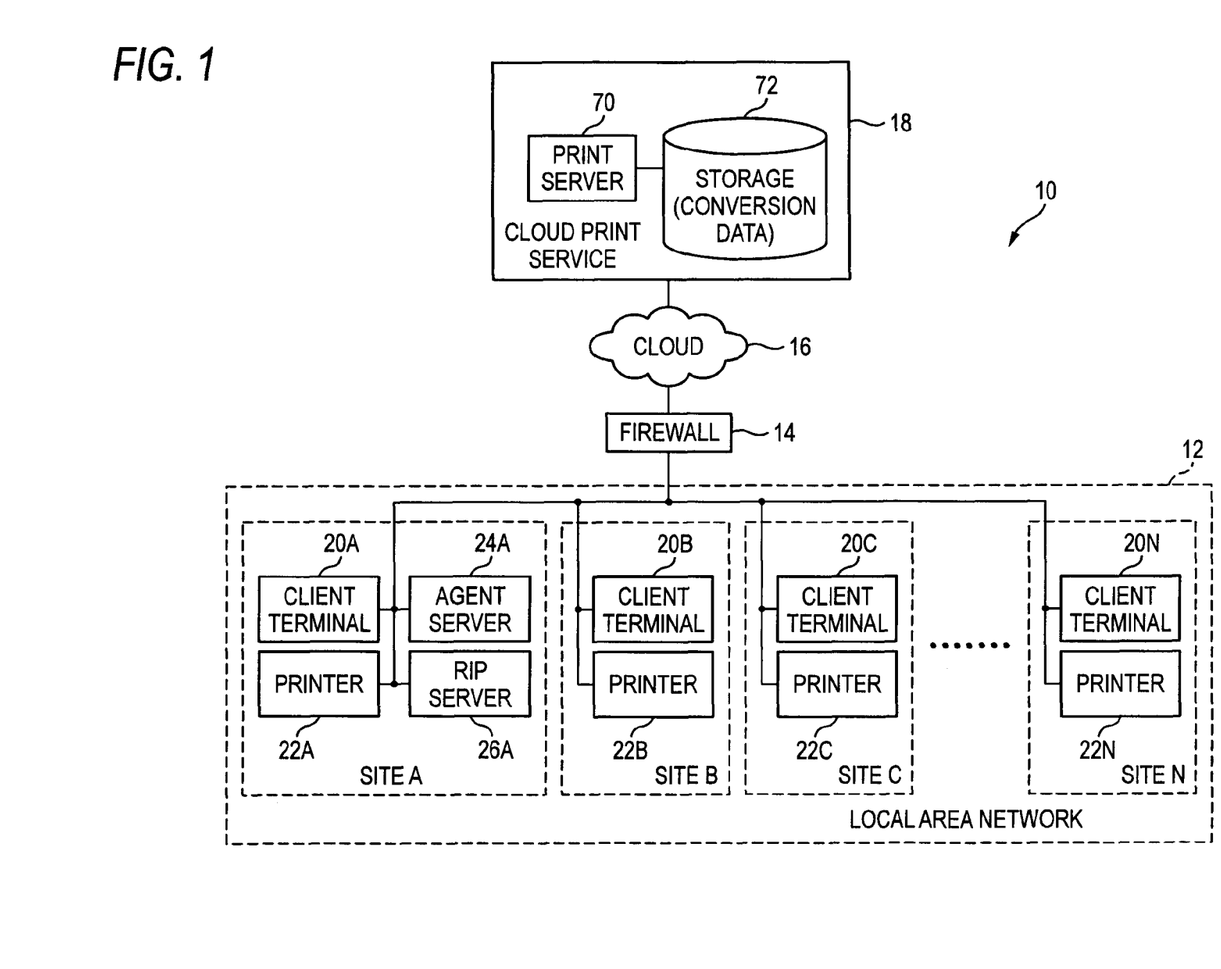
FIG. 1 is a block diagram showing an example of the configuration of a printing system.

An exemplary embodiment of the invention will be described below with reference to the drawings.
<Printing System>
First, the configuration of a "printing system" according to the exemplary embodiment will be described.
FIG. 1 is a block diagram showing an example of the configuration of a printing system. As shown in FIG. 1, a printing system 10 according to the exemplary embodiment includes a local area network (LAN) 12, a firewall (FW) 14, a cloud 16, and a cloud print service 18. The "cloud" mentioned herein means a public network such as the Internet. The cloud print service 18 is a service providing apparatus which is connected to the cloud 16 and which provides print service to any user who has logged in. The FW 14 restricts access between the LAN 12 and the cloud 16.

The LAN 12 is configured to include at least one client terminal 20, at least one printer 22, at least one agent server 24, and at least one RIP server 26. The client terminal 20, the printer 22, the agent server 24 and the RIP server 26 are connected to one another through the LAN 12 so as to communicate with one another. In addition, each of the client terminal 20, the printer 22, the agent server 24 and the RIP server 26 communicates with any device on the cloud 16 under the restriction performed by the FW 14.

In the illustrated example, devices disposed in a plurality of sites such as Site A, Site B, Site C, . . . , and Site N are connected to one another through the LAN 12 so as to be able to communicate with one another. A client terminal 20A, a printer 22A, an agent server 24A, and an RIP server 26A are disposed in the Site A. A client terminal 20B and a printer 22B are disposed in the Site B. A client terminal 20C and a printer 22C are disposed in the Site C. A client terminal 20N and a printer 22N are disposed in the Site N. Incidentally, when it is not necessary to distinguish the devices disposed in these sites from one another, the devices will be simply referred to as the client terminal 20, the printer 22, the agent server 24 and the RIP server 26.

The client terminal 20 is an information processing apparatus such as a computer which can be connected to the cloud 16. In the exemplary embodiment, the client terminal 20 is allowed to gain access to the cloud print service 18. As will be described later (see FIG. 4), the client terminal 20 includes a Web browser 74. The Web browser 74 is an application program (which will be hereinafter referred to as "application" simply) for browsing Web pages. The client terminal 20 browses and operates the screen (Web page) displayed by the Web browser 74 so that the client terminal 20 can use applications (a conversion data registration application and a print instruction application) provided by the cloud print service 18.

The agent server 24 is an information processing apparatus such as a computer which can be connected to the cloud 16. In the exemplary embodiment, the agent server 24 is allowed to gain access to the cloud print service 18. In addition, in the exemplary embodiment, the FW 14 is set so that the cloud print service 18 cannot gain direct access to the printer 22. The agent server 24 performs communication with the cloud print service 18 instead of the printer 22 so as to supply data received from the cloud print service 18 to the printer 22.

The "data" supplied here means data ready to be printed, that is, data (hereinafter referred to as "conversion data") which have been converted in a bitmap format so that the data can be printed by the printer 22 without RIP processing. The conversion data include image data which have been converted into bitmap data, and print instruction information which includes print parameters such as pages and the number of copies.

The RIP server 26 is an information processing apparatus such as a computer. In the exemplary embodiment, the FW 14 is set so that the cloud print service 18 cannot gain direct access to the RIP server 26. The agent server 24 performs communication with the cloud print service 18 instead of the RIP server 26 so as to supply data received from the cloud print service 18 to the RIP server 26. The "data" supplied here means print data including image data which have not been RIP-processed and print instruction information.

The RIP server 26 receives the print data from the agent server 24 and performs RIP processing on the image data in accordance with the print instruction information. The "RIP (Raster Image Processor)" mentioned herein means processing for converting print data of a vector format generated by an information processing apparatus such as a computer into data (conversion data) of a bitmap format. The printer 22 receives conversion data which have been RIP-processed and executes print processing based on the conversion data. Since RIP processing is performed under the control of the RIP server 26 disposed in the LAN 12, colors and fonts can be managed easily in comparison with the case where RIP processing is performed by the cloud print service 18.

The cloud print service 18 includes a print server 70 and a storage 72. The print server 70 is a server executing print service. The print server 70 is constituted as an information processing apparatus such as a computer which can be connected to the cloud 16. Although the print server 70 is illustrated as a single server in the exemplary embodiment, configuration may be made so that a plurality of servers can execute the print service. The storage 72 is a storage device in which the conversion data are stored.

The print data are converted into data of the bitmap format by the RIP server 26 disposed in the LAN 12 and the conversion data are stored in advance in the storage 72 on the cloud 16. Since the conversion data which have been RIP-processed are supplied from the storage 72 to the printer 22, RIP processing during printing is not necessary but the speed of print processing can be improved. In addition, abundant resources on the cloud 16 can be used. Further, when conversion data are produced and stored in advance, the speed of print processing can be improved more greatly. Incidentally, the detailed configuration and operation of the cloud print service 18 will be described later.

(Client Terminal Etc.)

The client terminal 20 will be described below.

Figure 2:
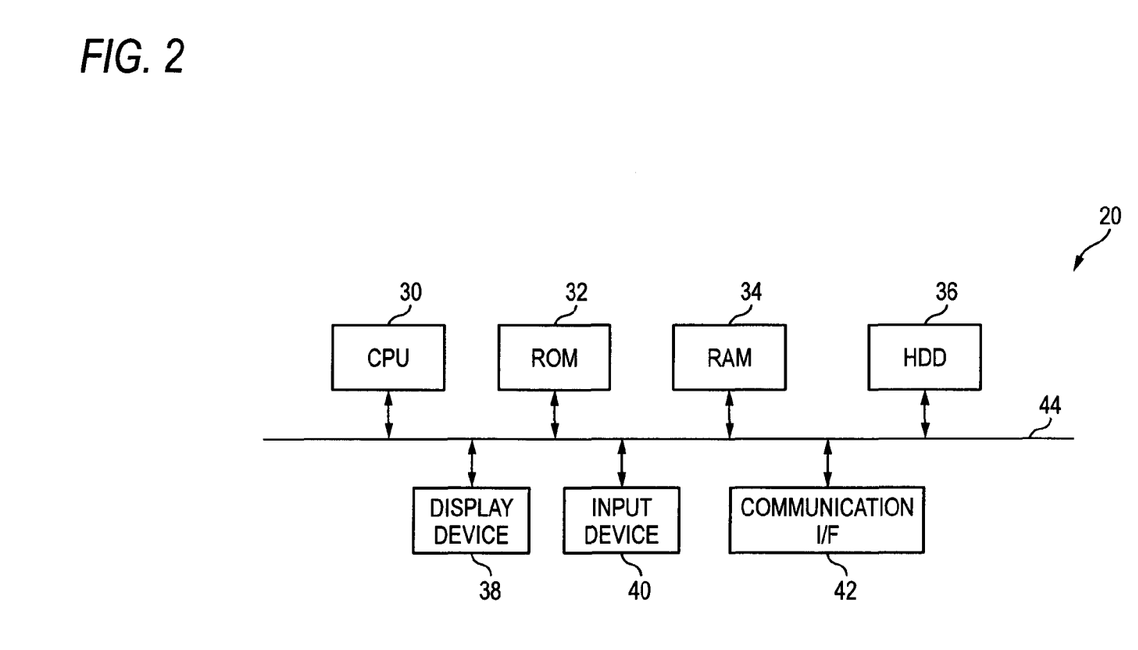
FIG. 2 is a block diagram showing an example of the configuration of a client terminal.

FIG. 2 is a block diagram showing an example of the electric configuration of the client terminal. As described above, the client terminal 20 is an information processing apparatus such as a computer. The client terminal 20 is provided with a CPU (Central Processing Unit) 30, an ROM (Read Only Memory) 32, an RAM (Random Access Memory) 34, an HDD (Hard Disk Drive) 36 as a storage device, a display device 38 such as a display, an input device 40 such as a keyboard or a mouse, and a communication interface (I/F) 42 for making connection to a communication line.

The CPU 30, the ROM 32, the RAM 34, the HDD 36, the display device 38, the input device 40 and the communication I/F 42 are connected to one another through a bus 44. The CPU 30 reads programs stored in storage devices such as the ROM 32 and the HDD 36 and executes the programs using the RAM 34 as a work area. The programs also include application programs such as the Web browser 74.

Incidentally, various drives may be connected to the client terminal 20. The various drives are devices which can read data from computer-readable portable recording media such as a flexible disk, a magneto-optical disk and a CD-ROM and write data into the recording media. When the client terminal 20 is provided with the various drives, a program recorded on a portable recording medium may be read by corresponding one of the drives and executed by the client terminal 20.

In addition, each of the agent server 24, the RIP server 26 and the print server 70 is also an information processing apparatus such as a computer and has the same electric configuration as that of the client terminal 20. That is, each of the agent server 24, the RIP server 26 and the print server 70 has a CPU, an ROM, an RAM, an HDD, a display device, an input device and a communication I/F which are connected to one another through a bus.

(Printer)

The configuration of the printer 22 will be described below.

Figure 3:
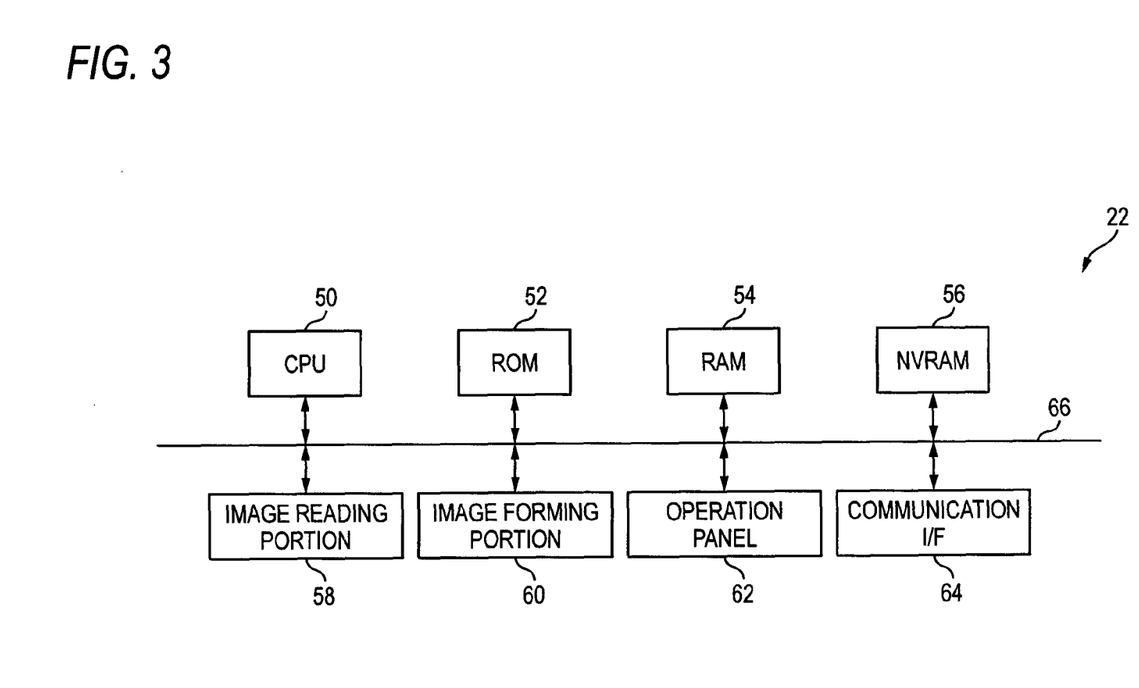
FIG. 3 is a block diagram showing an example of the configuration of a printer.

FIG. 3 is a block diagram showing an example of the electric configuration of the printer. The printer 22 is provided with a CPU 50, an ROM 52, an RAM 54, a nonvolatile memory (NVRAM) 56, an image reading portion 58, an image forming portion 60, an operation panel 62, and a communication I/F 64. The CPU 50, the ROM 52, the RAM 54, the NVRAM 56, the image reading portion 58, the image forming portion 60, the operation panel 62, and the communication I/F 64 are connected to one another through a bus 66.

The CPU 50, the ROM 52, the RAM 54 and the NVRAM 56 constitute a computer controlling the whole apparatus and performing various operations. That is, the CPU 50 can read various control programs and various setting values stored in storage devices such as the ROM 52 and the NVRAM 56, and execute the programs using the RAM 54 as a work area.

The image reading portion 58 is provided with a CCD image sensor etc., which can optically read an image formed on a recording medium such as a sheet of paper and generate image data. The image forming portion 60 can form an image on a recording medium by an electrographic method or an inkjet method. The operation panel 62 is configured to include a touch panel etc. for displaying various buttons and various screens.

With the aforementioned configuration, the operation panel 62 can accept an operation from a user and display various kinds of information to the user. The communication I/F 64 is a communication interface for making connection to a communication line. In the exemplary embodiment, the communication I/F 64 receives conversion data from the agent server 24 through the communication line.

<Cloud Print Service>

The cloud print service 18 will be described below.

Figure 4:
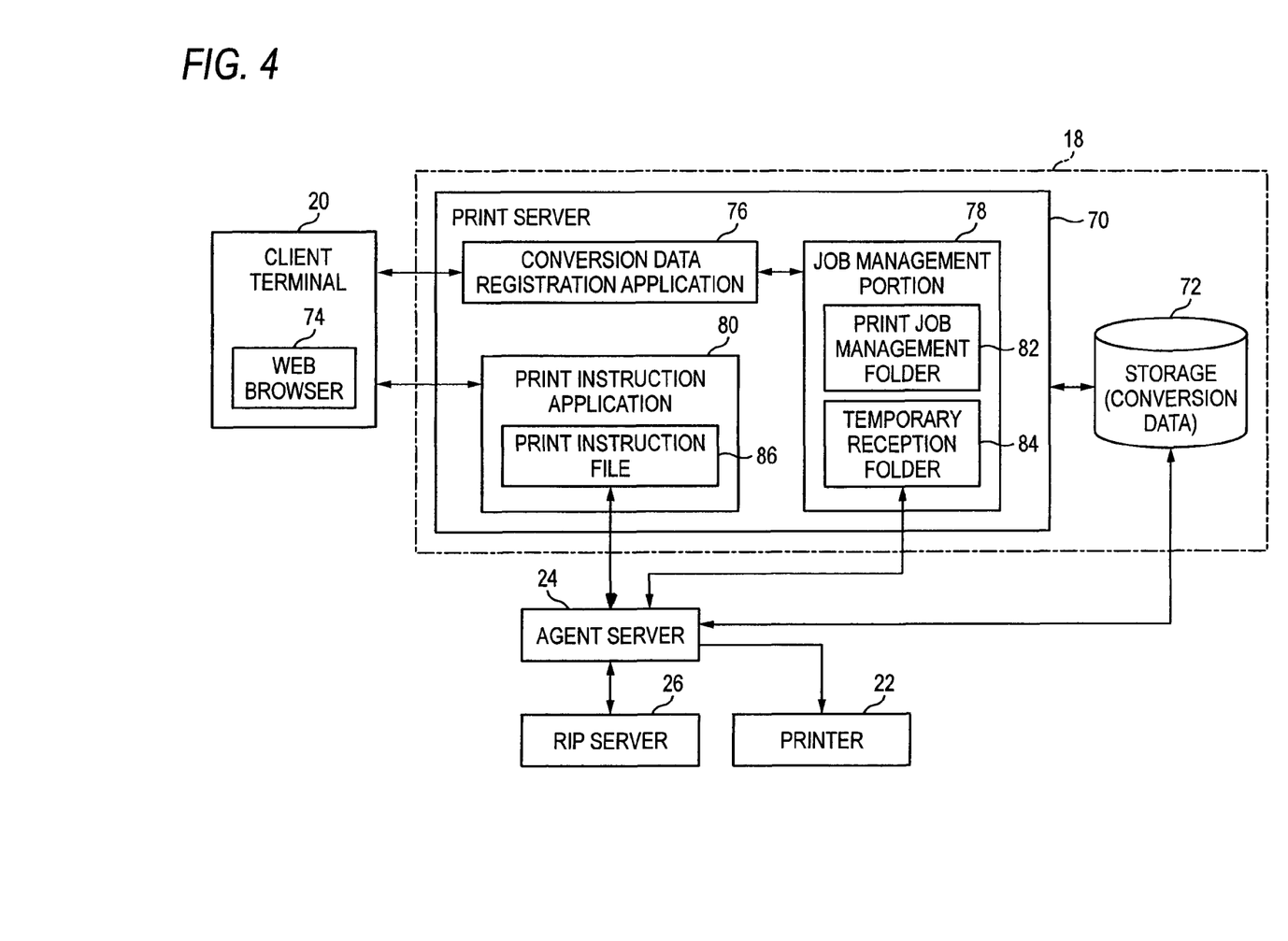
FIG. 4 is a block diagram showing an example of the functional configuration of a cloud print service.

FIG. 4 is a block diagram showing an example of the functional configuration of the cloud print service. The cloud print service 18 includes the print server 70 and the storage 72 storing conversion data. The print server 70 is a server executing print service. The print server 70 includes a conversion data registration application 76, a job management portion 78 and a print instruction application 80.

A print job management folder 82 and a temporary reception folder 84 are prepared in the job management portion 78. Print data are stored in the print job management folder 82 by a system administrator (not shown) managing the LAN 12. The print data include image data which have not been RIP-processed and print instruction information. When an instruction to register conversion data is issued from the client terminal 20, print data relevant to the registration instruction are temporarily stored in the temporary reception folder 84. Since the print data are managed on the cloud 16, the kind of the recording medium and post processing can be set easily.

The conversion data registration application 76 is an application program which can execute a "conversion data registration process" to acquire conversion data based on the print data stored in the temporary reception folder 84 and store the acquired conversion data in the storage 72. The print instruction application 80 is an application program which can supply the conversion data stored in the storage 72 to the printer 22 in accordance with a print instruction. The conversion data are supplied to the printer 22 through the agent server 24.

An operation sequence of "conversion data registration" performed by the conversion data registration application 76 and an operation sequence of a "print instruction" performed by the print instruction application 80 will be described specifically with reference to the drawings. Here, print data will be referred to as "job file" and print instruction information contained in the print data will be referred to as "job ticket".

(Conversion Data Registration Sequence)

Figure 5:
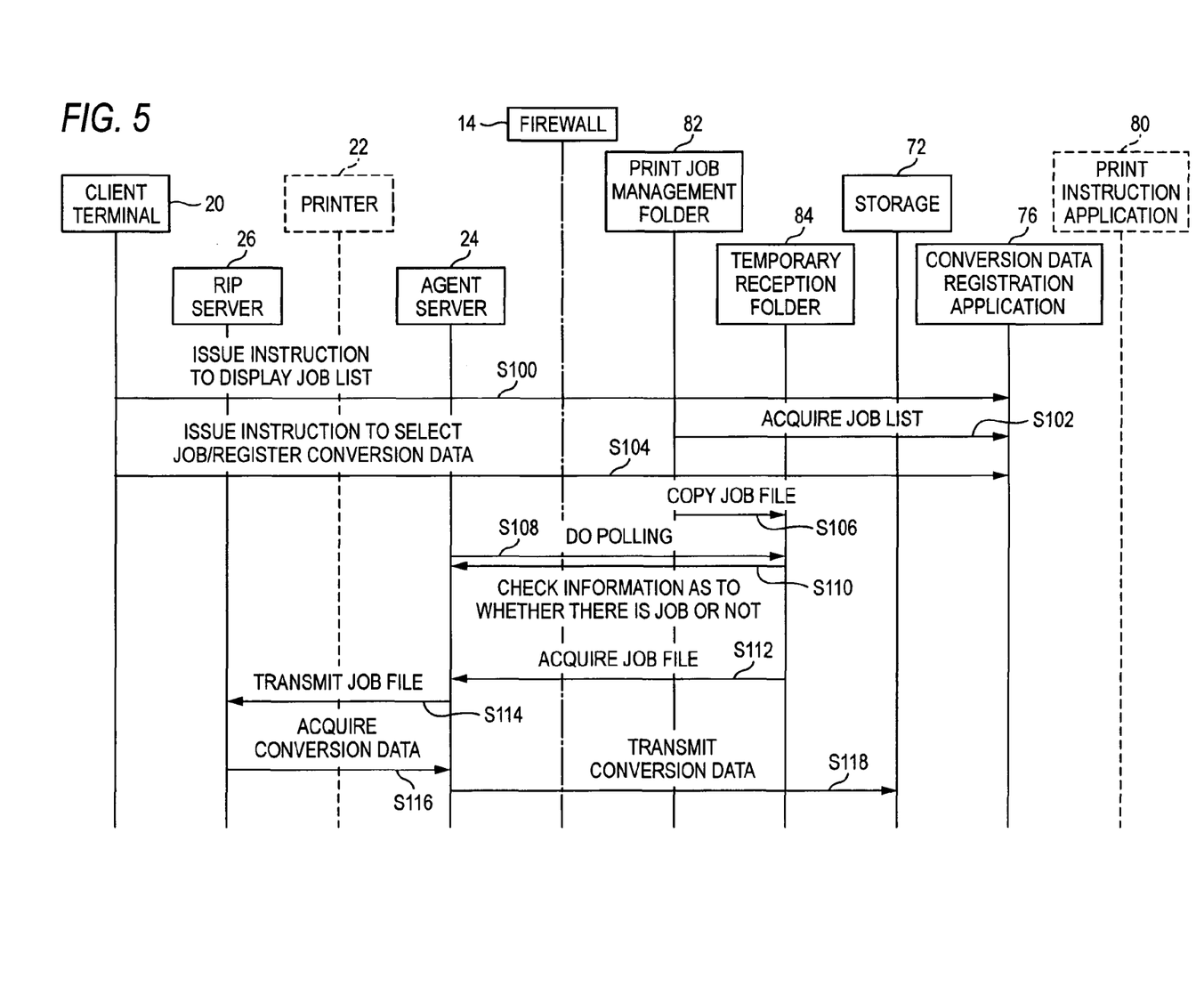
FIG. 5 is a view showing an operation sequence at the time of registration of conversion data.

FIG. 5 is a view showing an operation sequence at the time of registration of conversion data. The operation sequence of "conversion data registration" will be described with reference to FIG. 4 and FIG. 5. When the client terminal 20 gains access to the conversion data registration application 76, the sequence starts. The client terminal 20 browses and operates the screen displayed by the Web browser 74 so that the client terminal 20 can use the conversion data registration application 76.

First, in Step 100, an instruction to display a list of job files stored in the print job management folder 82 is issued from the client terminal 20. Next, in Step 102, the conversion data registration application 76 acquires the list of job files from the print job management folder 82 in accordance with the instruction. Data for displaying the list of job files are transmitted to the client terminal 20 by a list display function of the conversion data registration application 76. The list of job files is displayed on the display device of the client terminal 20 by the Web browser 74. Next, in Step 104, an instruction to register conversion data of a selected job file is issued from the client terminal 20.

Figure 7:
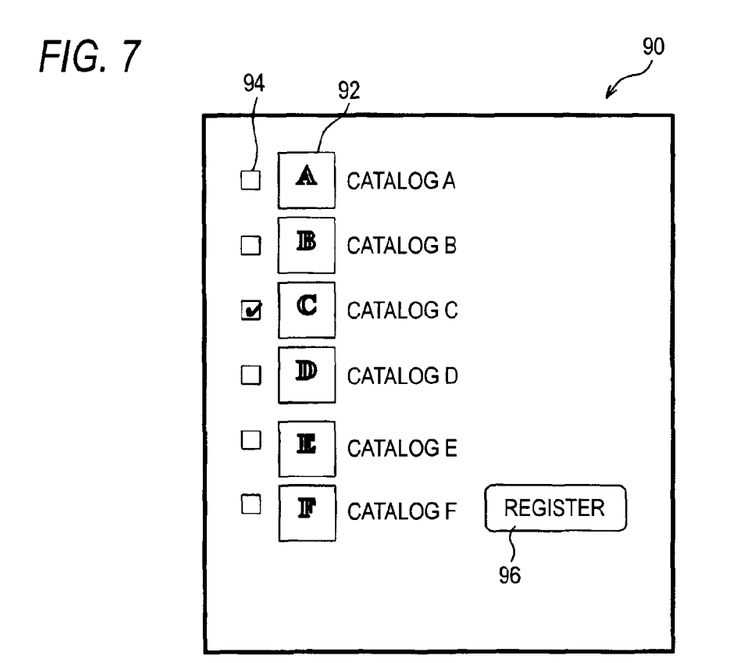
FIG. 7 is a view showing an example of a screen displayed by a Web browser.

FIG. 7 is a view showing an example of a screen displayed by the Web browser 74. On a screen 90 in this example, a plurality of job files 92 with file names A to F are listed and displayed so that one can be selected from the job files 92 by checking a corresponding check box 94. For example, the job file 92 with the file name "A" is a job file for registering print data of Catalog A as conversion data. A registration button 96 is also disposed on the screen 90. A user selects a job file by checking a corresponding check box 94 and operates the registration button 96 to issue an instruction to register the job file. For example, a job file "C" is selected in this example.

Next, in Step 106, the selected job file is copied from the print job management folder 82 to the temporary reception folder 84 in accordance with the instruction by a selection function and a registration function of the conversion data registration application 76. The conversion data registration file 76 may also have a job file edition function to be able to perform replacement or change of a text, replacement of an image, etc. In this case, the job file which has been edited is copied to the temporary reception folder 84. In addition, the job file may be completed by edition.

Next, in Steps 108 and 110, the agent server 24 checks whether or not there is a job file for which an instruction to register conversion data has been issued. The agent server 24 polls the temporary reception folder 84 at a predetermined timing. When the job file is completely copied from the print job management folder 82 to the temporary reception folder 84, the copied job file can be confirmed by the agent server 24.

When confirming the job file, the agent server 24 then acquires the job file from the temporary reception folder 84 in Step 112. Next, in Step 114, the agent server 24 transmits the acquired job file to the RIP server 26. The RIP server 26 performs RIP processing in accordance with the job ticket. Next, in Step 116, the RIP server 26 transmits the RIP-processed conversion data to the agent server 24.

Next, in Step 118, the agent server 24 transmits the conversion data to the storage 72. The transmitted conversion data are stored in the storage 72. Here, the conversion data may be compressed and then stored. For example, the conversion data may be compressed in accordance with the performance (the resolution and the print quality) of the outputting printer 22. The speed of print processing can be improved without spoiling the print quality. In addition, resources on the cloud 16 can be saved. Further, the transfer rate of conversion data which have been compressed can be improved in comparison with the transfer rate of the conversion data which have not been compressed.

(Print Instruction Sequence)

Figure 6:
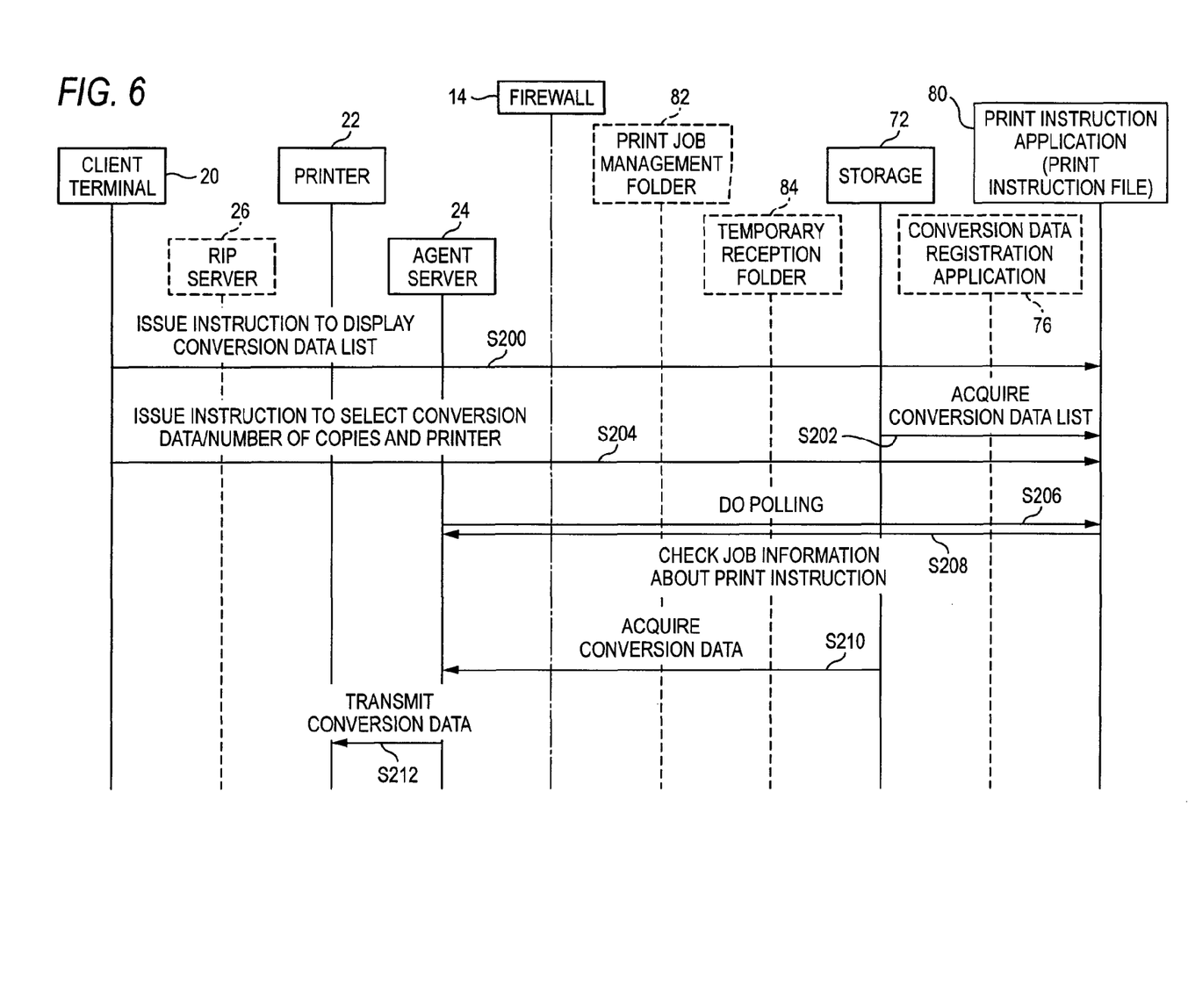
FIG. 6 is a view showing an operation sequence at the time of a print instruction.

FIG. 6 is a view showing an operation sequence at the time of a print instruction. The operation sequence of the "print instruction" will be described with reference to FIG. 4 and FIG. 6. When the client terminal 20 gains access to the print instruction application 80, the sequence starts. The client terminal 20 browses and operates the screen displayed by the Web browser 74 so that the client terminal 20 can use the print instruction application 80.

First, in Step 200, an instruction to display a list of conversion data stored in the storage 72 is issued from the client terminal 20. Next, in Step 202, the print instruction application 80 acquires the list of the stored conversion data from the storage 72 in accordance with the instruction. Data for displaying the list of the conversion data are transmitted to the client terminal 20 by a list display function of the print instruction application 80. The list of the conversion data is displayed on the display device of the client terminal 20 by the Web browser 74. Next, in Step 204, an instruction to print selected conversion data is issued from the client terminal 20. Incidentally, an instruction to select the number of copies and a printer as the output destination is also issued.

Figure 8:
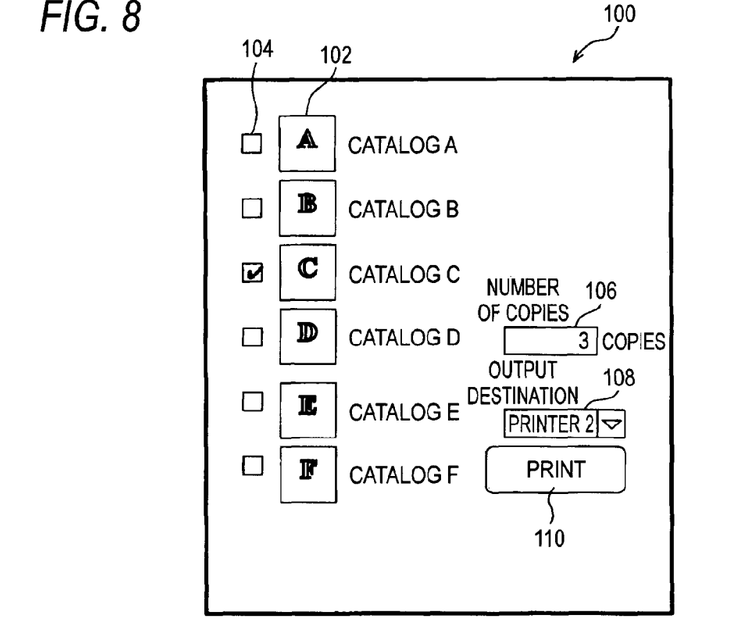
FIG. 8 is a view showing another example of the screen displayed by the Web browser.

FIG. 8 is a view showing another example of a screen displayed by the Web browser 74. On a screen 100 in the example, a plurality of job files 102 with file names A to F are listed and displayed so that one can be selected from the job files 102 by checking a corresponding check box 104. For example, the job file 102 with the file name "A" is a job file for performing print processing based on conversion data of Catalog A. A number-of-copies setting portion 106, an output destination setting portion 108, and a print instruction button 110 are also disposed on the screen 100.

A user checks a check box 104 to select a corresponding one of the job files. Then, the user sets the number of copies to be printed and the output destination in the number-of-copies setting portion 106 and the output destination setting portion 108 and operates the print instruction button 110 to issue an instruction to print. For example, in this example, the job file "C" is selected, and the number of copies "3" and the output destination "Printer 2" are set. By a selection function, a setting function and a print instruction function of the print instruction application 80, "job information about print instruction" is stored in a print instruction file 86.

Next, in Steps 206 and 208, the agent server 24 checks whether there is a print instruction or not, and acquires "job information about print instruction" when there is a print instruction. The "job information about print instruction" mentioned herein includes information indicating the selected conversion data, the set number of copies to be printed, and the set output destination (printer). The agent server 24 polls the print instruction file 86 of the print instruction application 80 at a predetermined timing.

When the "job information about print instruction" is acquired, the agent server 24 then acquires the conversion data from the storage 72 in Step 210. Next, in Step 212, the agent server 24 transmits the acquired conversion data to the printer 22. The printer 22 performs print processing based on the acquired conversion data. Since the RIP-processed conversion data are supplied to the printer 22, RIP processing at the time of printing is not necessary but the speed of print processing can be improved. In addition, abundant resources on the cloud 16 can be used.

The agent server 24 may be provided with a cache function to hold the acquired conversion data. In the case where reprinting is performed, it is not necessary to acquire the conversion data from the storage 72 but the speed of print processing can be improved.

Incidentally, description has been made above along the example where the firewall (FW) is provided to restrict access between the LAN and the cloud. However, the FW is not essential. When the FW is not provided, the agent server can be removed so that the cloud print service and the RIP server can gain direct access to each other and the cloud print service and the printer can gain direct access to each other.

In addition, description has been made above along the example where the agent server and the RIP server are disposed in the Site A of the LAN. However, the invention is not limited thereto. As long as at least one agent server and at least one RIP server are disposed in the LAN, the same effects as those according to the exemplary embodiment can be obtained even in the case where the cloud print service is used from another site.

In addition, the configurations of the print service providing apparatus and the printing system which have been described in the exemplary embodiment are simply exemplary. It is a matter of course that the configurations may be changed without departing from the spirit and scope of the invention.

What is claimed is:

1. A print service providing apparatus which is disposed on a network and connected to at least one printer and an information processing unit through a communication line so as to provide print service, the apparatus comprising:
a supply unit that is connected to the printer through the communication line;
a storage unit that stores, in advance, conversion data, the conversion data having been converted into a bitmap format remote from said at least one printer and remote from the print service providing apparatus, the storage unit being connected to the supply unit through the communication line; wherein:
the information processing unit is connected to the supply unit through the communication line and processes print data of a vector format to thereby generate conversion data converted into a bitmap format;
the conversion data converted into the bitmap format is stored in a compressed manner using a compression method corresponding to at least one of resolution and print quality of the outputting printer;
the supply unit acquires print data and supplies the print data to the information processing unit, and acquires the conversion data from the information processing unit to transmit the conversion data to the storage unit; and
the supply unit acquires, in accordance with a print instruction, the conversion data stored in the storage unit and supplies the conversion data to the printer connected through the communication line and designated in accordance with the print instruction.

2. The print service providing apparatus according to claim 1, wherein the conversion data which have been converted into the bitmap format are stored in a compressed manner using a compression method corresponding to the performance of the outputting printer.

3. The print service providing apparatus according to claim 1, wherein the print service providing apparatus is further connected to an RIP server disposed in a LAN through said communication line so as to provide print service, and the conversion data is converted into a bitmap format by the RIP server.

4. A printing system comprising:
at least one printer;
a first information processing apparatus that is connected to the printer through a communication line;
a second information processing apparatus that is connected to the first information processing apparatus through a communication line and that processes print data of a vector format to thereby generate conversion data converted into a bitmap format; and
a print service providing apparatus that has a storage unit storing, in advance, the conversion data, the conversion data being converted into a bitmap format remote from said at least one printer and remote from the print service providing apparatus, and the storage unit being disposed on a network and connected to the first information processing apparatus and the printer through the communication line so as to provide print service; wherein:
the conversion data converted into the bitmap format is stored in a compressed manner using a compression method corresponding to at least one of resolution and print quality of the outputting printer;
the first information processing apparatus acquires print data from the print service providing apparatus to supply the print data to the second information processing apparatus, and acquires the conversion data from the second information processing apparatus to transmit the conversion data to the print service providing apparatus; and
the first information processing apparatus acquires, in accordance with a print instruction, the conversion data stored in the storage unit, and supplies the conversion data to the printer designated in accordance with the print instruction.

5. The printing system according to claim 4, wherein the first information processing apparatus is connected to the print service providing apparatus through a firewall.

6. The printing system according to claim 5, wherein
the print service providing apparatus is further provided with a management unit that manages print data until the print data are acquired by the first information processing apparatus and an edition unit that edits the print data; and
when the print data have been edited by the edition unit, the management unit manages the edited print data.

7. The printing system according to claim 5, wherein the first information processing apparatus is further provided with a holding unit that holds the data ready to be printed even after the data have been supplied to the printer.

8. The printing system according to claim 4, wherein
the print service providing apparatus is further provided with a management unit that manages print data until the print data are acquired by the first information processing apparatus and an edition unit that edits the print data; and
when the print data have been edited by the edition unit, the management unit manages the edited print data.

9. The printing system according to claim 4, wherein the first information processing apparatus is further provided with a holding unit that holds the data ready to be printed even after the data have been supplied to the printer.

10. The printing system according to claim 4, wherein the print service providing apparatus is further connected to an RIP server disposed in a LAN through said communication line so as to provide print service, and the conversion data is converted into a bitmap format by the RIP server.

* * * * *